(12) United States Patent
Ahn

(10) Patent No.: US 7,697,853 B2
(45) Date of Patent: Apr. 13, 2010

(54) IMAGE FORMING APPARATUS IN WHICH A TONER IS SUBSTITUTED ACCORDING TO RELATIVE AMOUNTS OF TONERS AND METHOD OF CONTROLLING THE SAME

(75) Inventor: Byung Sun Ahn, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 25 days.

(21) Appl. No.: 11/945,587

(22) Filed: Nov. 27, 2007

(65) Prior Publication Data
US 2008/0181628 A1 Jul. 31, 2008

(51) Int. Cl.
*G03G 15/08* (2006.01)
(52) U.S. Cl. ........................................ 399/27
(58) Field of Classification Search .................. 399/27, 399/24; 358/1.14, 1.9, 28
See application file for complete search history.

(56) References Cited

U.S. PATENT DOCUMENTS 6,236,817 B1 * 5/2001 Kim ............................. 399/53
2001/0003457 A1 * 6/2001 Doi ............................... 347/5
2005/0219602 A1 * 10/2005 Mikami ..................... 358/1.14

FOREIGN PATENT DOCUMENTS

| JP | 11-227173 | 8/1999 |
| JP | 2001-71541 | 3/2001 |
| JP | 2006301328 A * | 11/2006 |

OTHER PUBLICATIONS

Office Action issued by State Intellectual Property Office of China in Chinese Patent Application No. 2007101691755 on Jun. 5, 2009.

* cited by examiner

*Primary Examiner*—Quana M Grainger
(74) *Attorney, Agent, or Firm*—Staas & Halsey LLP

(57) ABSTRACT

An image forming apparatus and a method of controlling the same, in which a toner of another color is substituted for a toner having a remaining amount less than or equal to a minimum amount sufficient to perform remaining printing operation. A substitute toner used for the remaining printing operation is determined according to the amounts of toners remaining in the developing cartridges. A length of time to exhaust the different toners of different colors is balanced so that all developing cartridges are exchanged at a same time.

17 Claims, 4 Drawing Sheets

IMAGE FORMING APPARATUS IN WHICH A TONER IS SUBSTITUTED ACCORDING TO RELATIVE AMOUNTS OF TONERS AND METHOD OF CONTROLLING THE SAME

CROSS-REFERENCE TO RELATED APPLICATION

This application claims all benefits accruing under 35 U.S.C. §119 from Korean Patent Application No. 2007-8404, filed on Jan. 26, 2007, in the Korean Intellectual Property Office, the disclosure of which is incorporated herein by reference.

BACKGROUND OF THE INVENTION

1. Field of the Invention

Aspects of the present invention relate generally to an image forming apparatus and a method of controlling the same, and more particularly to an image forming apparatus capable of continuing a printing operation using a toner of another color when a toner is insufficient during the printing operation and a method of controlling the same.

2. Description of the Related Art

Generally, an image forming apparatus, such as a laser printer, a photocopier, a facsimile machine, or a multifunctional product, charges a photosensitive medium and then selectively radiates a laser beam onto the photosensitive medium to expose the photosensitive medium, thereby forming an electrostatic latent image. The electrostatic latent image is developed by a developing unit using a developing toner, and the developed electrostatic latent image is transferred to a printing medium and fixed thereon by applying pressure and heat to print an image on the printing medium.

In general, the colors of toners used for a developer include yellow (Y), magenta (M), cyan (C), and black (B), which overlap to form a complete, full color image.

The amount of color toners remaining in the developing unit is checked during a printing operation, and if the amount of one of the four color toners decreases to a level below a minimum amount, the printing operation is stopped. However, as the printing operation is stopped, inconvenience may be caused if the user would rather continue the printing operation so as to rapidly obtain a print output.

Furthermore, in order to perform the remaining printing operation, the color toner having an insufficient level remaining must be exchanged. As the amounts of the color toners remaining are different from each other, the length of time for each color toner to be exhausted, or consume periods of color toners, are different for each color toner. For this reason, the user must individually exchange the color toner that has been exhausted, causing further inconvenience to the user.

SUMMARY OF THE INVENTION

Accordingly, aspects of the present invention provide an image forming apparatus and a method of controlling the same, in which a toner remaining in an insufficient amount is exchanged for another toner according to the remaining amount of the toners when a printing operation is stopped due to a lack of the color toner, thereby balancing the consume period of the toners and facilitating the exchange of a developing cartridge that stores the toners according to colors.

Additional aspects and/or advantages of the invention will be set forth in part in the description which follows and, in part, will be obvious from the description, or may be learned by practice of the invention.

Aspects of the present invention provide an image forming apparatus having a developing unit including developing cartridges to store a plurality of color toners and a controller arranged to perform a printing operation in which a substitute toner is selected to perform a remaining portion of the printing operation using the substitute toner, the substitute toner being selected when at least one of the color toners of the developing unit is insufficient to complete the printing operation.

According to aspects of the present invention, the image forming apparatus further includes a storage unit that stores information related to minimum amounts of the toners sufficient to perform the printing operation, wherein the controller determines the substitute toner from among the toners having a toner level which is not smaller than the minimum amount. The controller may exclude a toner having a specific color, such as yellow, when selecting the substitute toner. Further, the controller selects one color toner as the substitute toner.

According to aspects of the present invention, the image forming apparatus may further include a display unit that displays a toner exchange signal to indicate a time for exchange of the developing cartridges according to the control of the controller. The controller receives information related to the amount of the toners from the developing unit.

Aspects of the present invention also provide a method of controlling an image forming apparatus including a developing unit having developing cartridges that store a plurality of toners of different colors and a controller that controls components including the developing unit to perform printing operation, the method including determining whether the toner of the developing unit used for the printing operation is insufficient; selecting a toner of another color as a substitute toner when the toner is insufficient; and performing remaining printing operation using the substitute toner.

According to aspects of the present invention, the amount of the color toner is compared with a predetermined minimum amount and the controller determines that the toner is insufficient when the amount of the color toner is smaller than the minimum amount. The toner having a greatest amount from among the toners is selected as the substitute toner. When a toner is insufficient while the remaining printing operation is being performed, a color toner having a greatest amount from among remaining color toners is selected as the substitute toner. In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
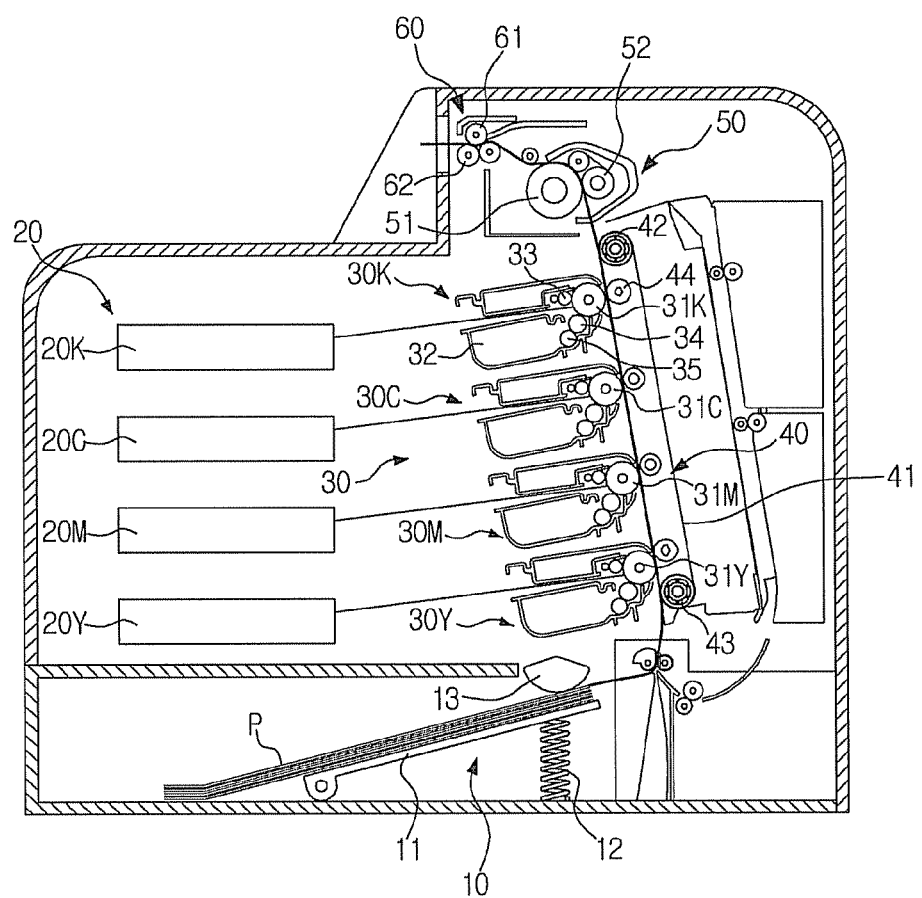
FIG. 1 is a view illustrating the structure of an image forming apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a structure of an image forming apparatus according to an example embodiment of the present invention. As illustrated in FIG. 1, the image forming apparatus according to aspects of the present invention includes a paper supplying unit 10, an exposing unit 20, a developing unit 30, a transferring unit 40, a fixing unit 50, and a paper discharging unit 60.

The paper supplying unit 10 includes a paper tray 11 on which a stack of printable media, such as papers P, to be printed is stored and a spring 12 that elastically supports the paper tray 11. The papers P stored on the paper tray 11 are individually picked up by a pick up roller 13 and are moved along a printing medium path toward the developing unit 30 via the transferring unit 40.

Figure 2:
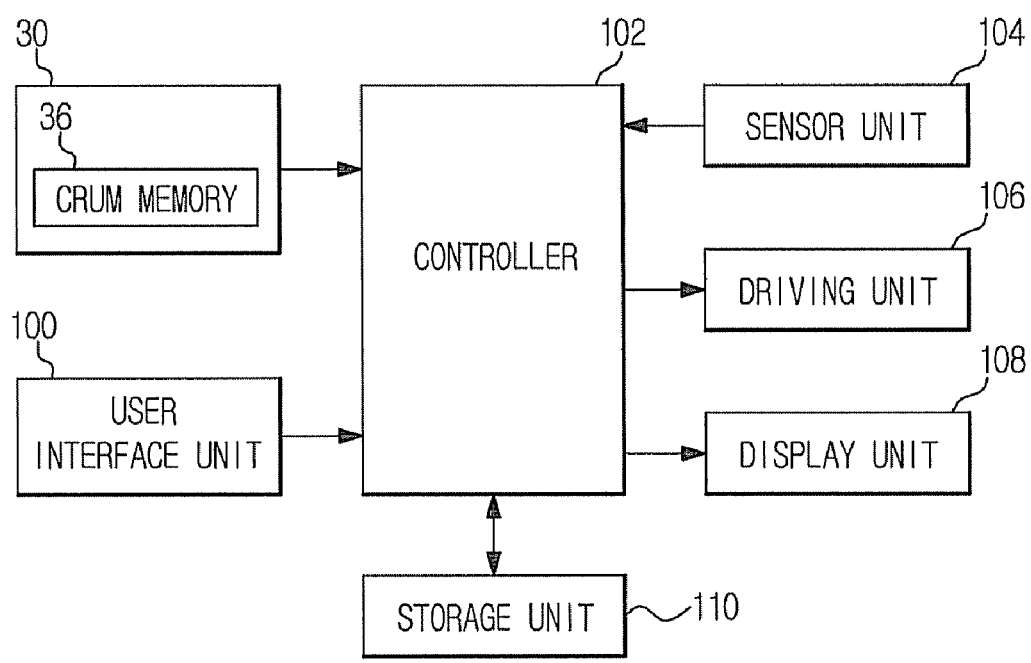
FIG. 2 is a block diagram of an image forming apparatus according to an example embodiment of the present invention.

The developing unit 30 includes four developing cartridges 30Y, 30M, 30C, and 30K in which different color toners, for example, yellow (Y), magenta (M), cyan (C), and black (K) toners are accommodated. However, the image forming apparatus of FIG. 1 is not limited thereto such that the developing unit 30 may include a greater or lesser number of developing cartridges, and developing cartridges of the image forming apparatus may include any color of toner so as to produce color or black and white images and text. The developing cartridges 30Y, 30M, 30C, and 30K respectively include photosensitive bodies 31Y, 31M, 31C, and 31K, on which electrostatic latent images are formed by the exposing unit 20. The exposing units 20Y, 20M, 20C, and 20K radiate light respectively corresponding to yellow (Y), magenta (M), cyan (C), and black (K) image information onto the photosensitive bodies 31Y, 31M, 31C, and 31K of the developing cartridges in accordance with a printing signal. The printing signal may be received by the image forming apparatus via a wired or wireless network or user device, such as a cellular telephone, personal digital assistant, personal or laptop computer, facsimile machine, camera, and the like. Further, the developing unit 30 includes a customer replacement unit monitor (CRUM) memory 36 as shown in FIG. 2. The CRUM memory 36 stores CRUM information that includes information related to an amount of a toner consumed by each of the developing cartridges 30Y, 30M, 30C, and 30K.

Each of the developing cartridges 30Y, 30M, 30C, and 30K includes a developing toner storage unit 32 in which a developing toner is stored, a charging roller 33 that charges each of the photosensitive bodies 31Y, 31M, 31C, and 31K, a developing roller 34 that develops the electrostatic latent images formed on the photosensitive bodies 31Y, 31M, 31C, and 31K into toner images, and a supplying roller 35 that transfers the toner stored in the storage unit 32 to the developing roller 34.

The transferring unit 40 transfers the toner images developed on the photosensitive bodies 31Y, 31M, 31C, and 31K to a paper P and includes a transferring belt 41 disposed to contact the photosensitive bodies 31Y, 31M, 31C, and 31K so as to move the paper P, individually, past the photosensitive bodies 31Y, 31M, 31C, and 31K so that the toner image may be transferred to the paper P; a driving roller 42 to drive the transferring belt 41; a tension roller 43 that maintains uniform tension in the transferring belt 41; and four transferring rollers 44 to transfer the toner image developed in the photosensitive bodies 31Y, 31M, 31C, and 31K to the paper P.

The fixing unit 50 applies heat and pressure to the individual paper P to fix a transferred toner image to the paper P and includes a heating roller 51 that applies heat from a heat source (not shown) to the paper P on which the transferred toner image is formed and a pressing roller 52 facing the heating roller 51 that maintains a uniform fixing pressure between the heating roller 51 and the pressing roller 52. The fixing unit 50 need not be limited thereto such that the fixing unit 50 may include any configuration to apply heat and pressure to the individual paper P to fix the image thereto. For example, the fixing unit 50 may include a belt traveling about a heating unit as driven by a driving roller.

The paper discharging unit 60 discharges the paper P on which the transferred toner image is fixed to the outside of the image forming apparatus and includes a paper discharging roller 61 that receives driving power to discharge the paper P and a paper discharging back up roller 62 facing the paper discharging roller 61. However, the paper discharging unit 60 is not limited thereto such that additional rollers may be included therein.

FIG. 2 is a block diagram of an image forming apparatus according to an example embodiment of the present invention. As shown in FIG. 2, the image forming apparatus includes a controller 102 to control the operation of printing. The controller 102 receives users' commands through a user interface unit 100. The user interface unit 100 may be a key pad for inputting the commands. The user commands may include commands to determine a mode of the image forming apparatus, such as copy, scan, and print, to start or stop operations of the image forming apparatus, to enter a number of copies to be made, to provide a network or email address to which a scanned document is to be sent, to turn the image forming apparatus on or off, and the like. Further, the user interface may include a touch screen, an LCD, plasma, or LED display, keys or buttons or the like. As such, the controller 102 may receive and control the operation of the printing operation according to the commands input through the user interface unit 100. Further, the controller 102 may receive user commands from a host computer as transmitted via a wired or wireless network or direct connection. Additionally, the user interface unit 100 may be an input window displayed on a monitor or display of a host computer or communication terminal.

When a power is supplied to the image forming apparatus and a printing command is received through the user interface unit 100, the controller 102 starts a printing operation based on print data received from a host computer (not shown). At this time, the controller 102 outputs a control signal for driving the components to a driving unit 106 based on various sensor information received from a sensor unit 104, such sensor information includes information from a paper supplying sensor (not shown) and a paper discharging sensor (not shown) provided along a paper feeding path to sense locations the paper P as the paper P travel along the paper feeding path. Accordingly, the driving unit 106 drives the components including various rollers (such as the tension roller 43, the transferring rollers 44, the pressing roller 52, and the paper discharge roller 61 as shown in FIG. 1 and as described above) so that the printing operation is performed. The controller 102 also controls the display of a printing state and error information on a display unit 108. The display unit 108 may be combined with the user interface unit 100 or include a display window to be display information on a host computer or other user device from the printing command is received.

As described above, the developing unit 30 includes a customer replacement unit monitor (CRUM) memory 36. The CRUM memory 36 stores CRUM information that includes information related to an amount of a toner consumed by each of the developing cartridges 30Y, 30M, 30C, and 30K used for the printing operation. Further, the CRUM memory 36 is not limited thereto such that the CRUM memory 36 may measure a level of the toner remaining in each of the developing cartridges 30Y, 30M, 30C, and 30K.

The controller 102 receives information related to the consumed amount of each of the toners according to colors from the CRUM memory 36 of the developing unit 30. The controller 102 determines whether an amount of toner remaining in each of the developing cartridges 30Y, 30M, 30C, and 30K is less than a minimum amount of the toner sufficient to perform the printing operation. However, the controller 102 may determine whether the amount of toner remaining in each of the developing cartridges 30Y, 30M, 30C, and 30K is greater than a minimum amount of the toner sufficient to perform the printing operation. Further, although an insufficient amount of toner is described as being smaller than the minimum amount, such amount is not limited thereto as an insufficient amount of toner may be equal to a minimum set point. Information related to the minimum amount of the color toners is previously stored in a storage unit 110. Further, the storage unit 110 may store information regarding printing jobs, predetermined settings of the image forming apparatus, IP addresses of computers connected thereto via a network, maintenance information, and the like.

If the user wishes to rapidly obtain a print output in a case in which at least one toner in the developing cartridges 30Y, 30M, 30C, and 30K is insufficient (below the minimum amount) while the printing operation is being performed, the controller 102 selects a substitute toner from among the other toners of different colors. As such, a remaining portion of the printing operation is performed using the substitute toner, i.e., the image forming apparatus continues the printing operation to produce the portion of the printing operation remaining in a partially completed print job when the amount of at least one toner in the developing cartridges 30Y, 30M, 30C, and 30K becomes insufficient while performing the printing operation. Further, the remaining portion of the printing operation may include a new printing operation from a new printing command when the amount of at least one toner in the developing cartridges 30Y, 30M, 30C, and 30K is insufficient when the new printing command is received by the image forming apparatus such that the remaining portion is a complete printing operation. The controller 102 may select the toner in the developing cartridges 30Y, 30M, 30C, and 30K that is present in the greatest amount from among the color toners having a level that is not smaller than the minimum amount as the substitute toner. A toner having a specific color may be excluded when the controller 102 selects the substitute toner. According to aspects of the present invention, the yellow (Y) toner may be excluded from selection by the controller 102 as the substitute toner. The yellow (Y) toner is excluded from consideration as the substitute toner as visibility of the produced image is degraded when the printing operation is performed using only the yellow (Y) toner. As such, the user who wishes to rapidly obtain the print output may not be satisfied with the print output. However, the controller 102 is not limited thereto such that the user may select as to whether to proceed if the yellow (Y) toner is the only option for selection as the substitute toner. Further, the yellow (Y) toner may be included when the electrostatic latent image corresponding to the toner of insufficient amount overlaps the electrostatic latent images corresponding to the remaining toners. The user may also select a preferred toner of a specific color to be used as the substitute toner.

If the selected substitute toner decreases to a level below the minimum amount while printing, a second substitute toner of another color is selected as described above to complete the printing operation. In this manner, as the substitute toners are used in accordance with the amounts of the various color toners while the printing operation is being performed, the time in which the different toners are used, or a consume period of the toners, can be balanced.

Figure 3:
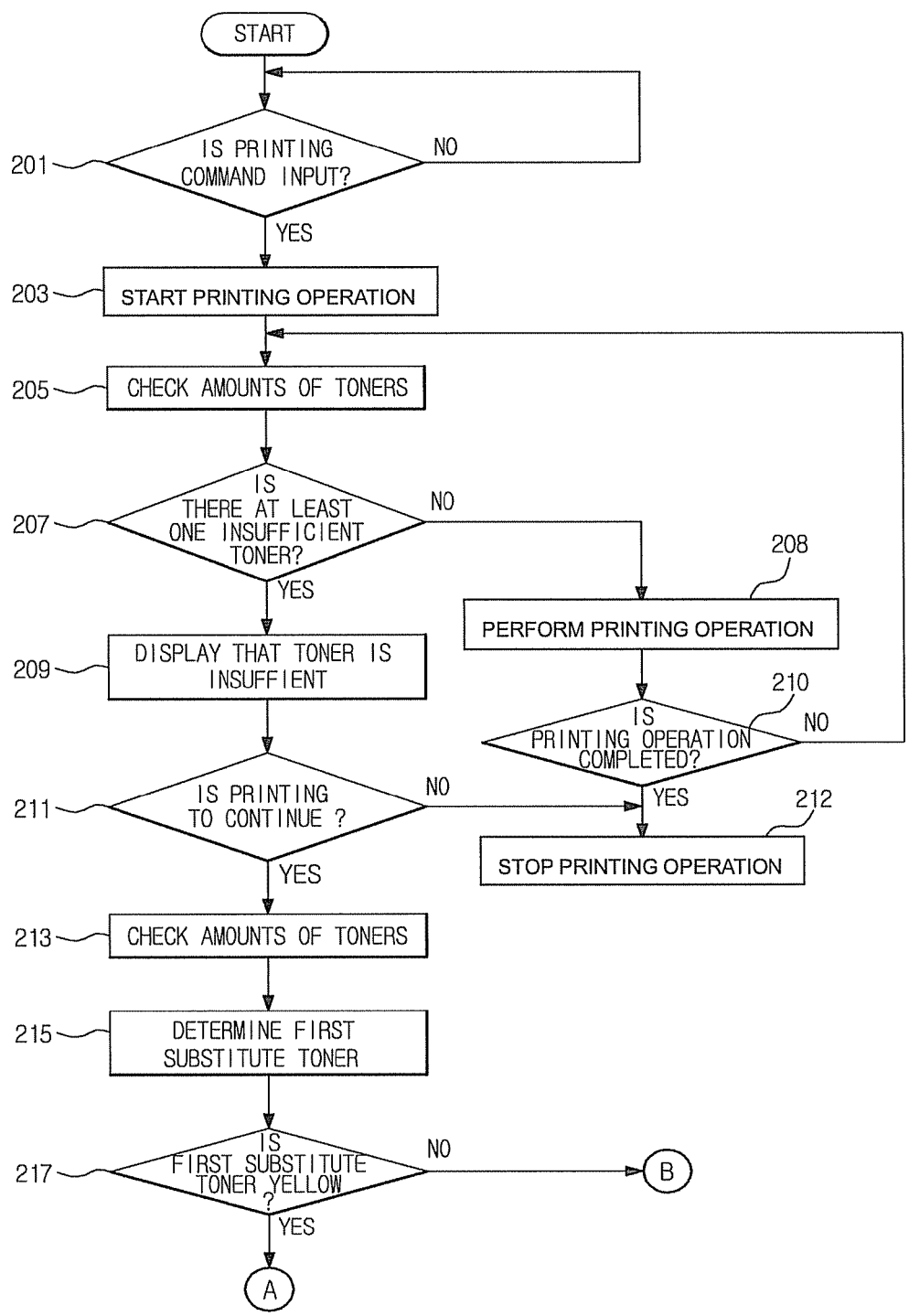
FIGS. 3 and 4 are flowcharts illustrating a method of controlling an operation of an image forming apparatus according to an example embodiment of the present invention.
Figure 4:
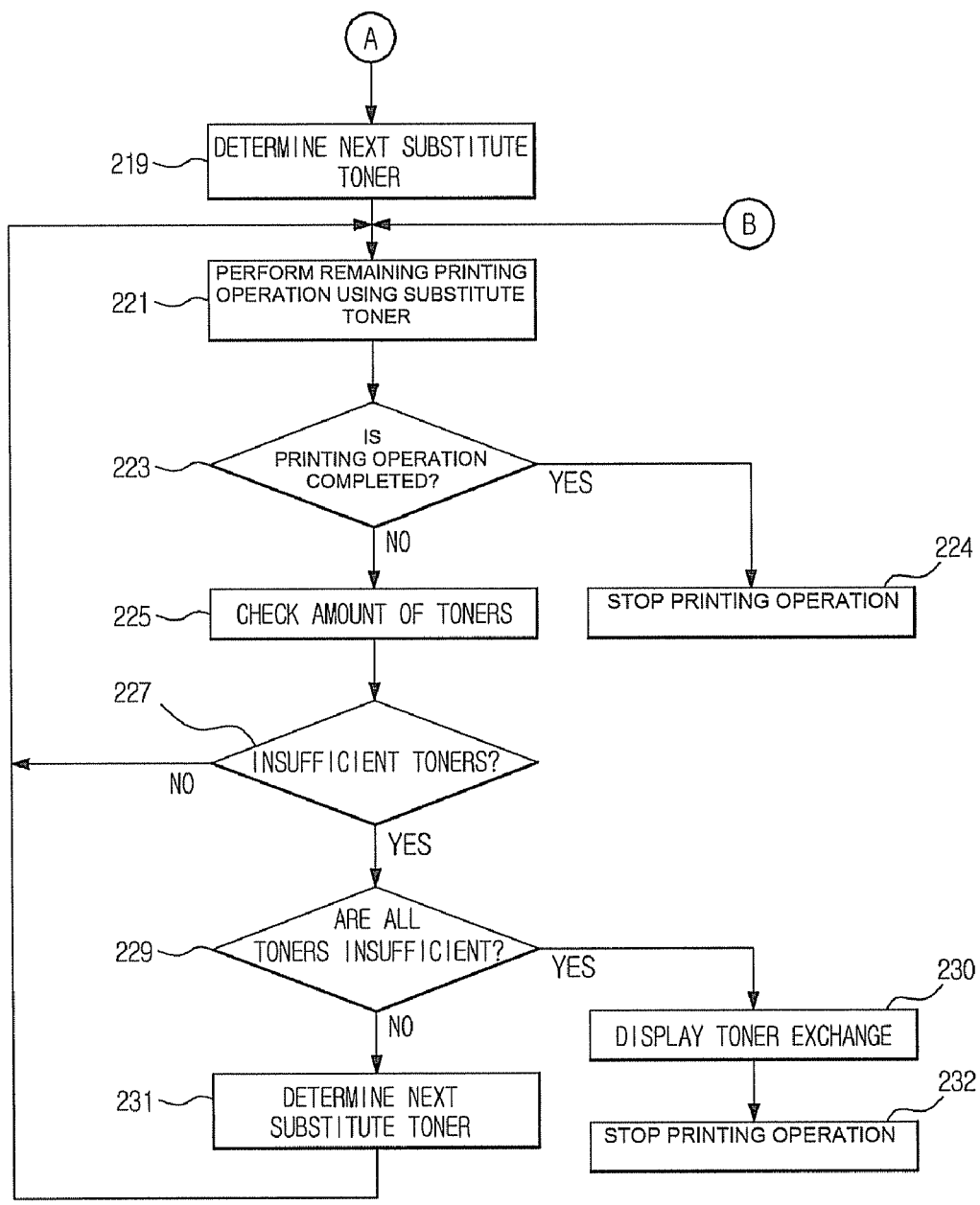

Hereinafter, a method of controlling the image forming apparatus according to aspects of the present invention having the above structure will be described in detail with reference to FIGS. 3 and 4.

First, the controller 102 determines whether a printing command is input through the user interface unit 100 at block 201. When the controller 102 determines that the printing command has been received, the controller 102 controls the driving unit 106 based on the sensor information of the sensor unit 104 to start a printing operation based on print data received from a host computer (not shown) at block 203.

During the printing operation, the controller 102 checks the amounts of the color toners stored in the developing unit 30 at block 205 to determine whether there is at least one toner whose amount is less than the minimum amount as stored in the storage unit 110 at block 207. When the controller 102 determines that there is not a toner stored at a level less than the minimum amount, the printing operation is performed at block 208. Then, the controller 102 determines whether the printing operation is completed at block 210. The process returns to checking the amount of toners at block 205 to continuously perform the printing operation when the controller 102 determines that the printing operation is not completed, and the printing operation is stopped when the controller 102 determines that the printing operation is completed at block 212.

When the controller 102 determines that there is at least one toner present at a level less than the minimum amount, i.e., that there is at least one insufficient toner at block 207, the controller 102 displays a signal indicating the lack of sufficient toner on the display unit 108 so that the user can recognize the lack of sufficient toner at block 209.

Then, the controller 102 determines whether a user's command to perform the remaining portion of the printing operation is input through the user interface unit 100 at block 211. When the controller 102 determines that the user's command is not input within a predetermined period of time, the printing operation is stopped at block 212. When the controller 102 determines that the user's command to continue the printing operation is input, the controller 102 checks whether the amounts of the remaining color toners excluding the toner are present at a level less than the minimum amount at block 213 and selects the toner having the greatest amount as a first substitute toner at block 215. However, the user's command to continue or to not continue the remaining portion of the printing operation may be input before the printing operation is began or set up as a default setting.

Then, the controller 102 determines whether the color of the toner selected as the first substitute toner is yellow at block 217. When the controller 102 determines that the color of the toner selected as the first substitute toner is yellow, the yellow toner is excluded and the toner having the greatest amount from among the remaining toners is selected as the next substitute toner at block 219.

When the controller 102 determines that the color of the toner selected as the first substitute toner or the next substitute toner is not yellow, the controller 102 performs the remaining portion of the printing operation using the selected substitute toner at block 221. Then, the controller 102 determines whether the printing operation is completed at block 223. When the controller 102 determines that the printing operation is completed, the printing operation is stopped at block 224. When the controller 102 determines that the printing operation is not completed at block 223, the amount of the substitute toner used for the remaining portion of the printing operation is checked at block 225. Then, the controller 102 determines whether the amount of the substitute toner is insufficient, that is, whether the amount of the toner is smaller than the minimum amount at block 227. Although an insufficient amount of toner is described as being smaller than a minimum, such amount is not limited thereto as an insufficient amount of toner may be equal to a minimum set point. When the controller 102 determines that the substitute toner is not insufficient at block 227, the controller 102 returns the process in which the remaining portion of the printing operation is performed at block 221.

When the controller 102 determines that the substitute toner is insufficient at block 227, the controller 102 determines whether all of the toners are insufficient at block 229. When the controller 102 determines that all of the toners are not insufficient at block 229, the color toner whose amount is not smaller than the minimum amount and is greatest among the remaining color toners is selected as the next substitute toner at block 231 and the controller 102 returns the process to perform the remaining portion of the printing operation at block 221 using the next substitute toner. In this manner, while the printing operation is being performed using one of the color toners, if the amount of the toner is decreased such that the amount of the first substitute toner or any substitute toner is insufficient, the color toner whose amount is greatest among remaining color toners is selected as the substitute toner. As such, the consume period of the color toners is balanced. When the controller 102 determines the next substitute toner at block 231, the controller 102 may exclude the yellow (Y) toner as described above with respect to determining the first substitute toner in the blocks 215 to 219.

When the controller 102 determines that all toners are insufficient at block 229, a toner exchange signal is displayed at block 230 so that all developing cartridges 30Y, 30M, 30C, and 30K that store the developing toners according to colors (i.e., yellow (Y), magenta (M), cyan (C), and black (K) toners) can be exchanged at a same time at block 230. As such, the printing operation is stopped at block 232.

As described above, according to aspects of the present invention, when the printing operation is stopped due to an insufficient amount of the toner, a substitute toner is selected in accordance with the amounts of the toners so that a remaining portion of the printing operation can be performed. Therefore, the consume period of the color toners can be uniformly balanced. As a result, when all color toners are insufficient, it is possible to exchange the developing cartridges at a same time.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the image forming apparatus may accept a default setting to continue or to not continue the printing operation without an input command received from a user when one of the toners decreases to an amount less than the minimum amount sufficient to complete the printing operation. Further, the image forming apparatus may determine the levels of the respective toners and provide a substitute toner to balance the use of the respective toners before one of the toners decreases to an amount less than the minimum amount. Accordingly, it is intended, therefore, that the present invention not be limited to the various example embodiments disclosed, but that the present invention includes all embodiments falling within the scope of the appended claims.

What is claimed is:

1. An image forming apparatus, comprising:
    a developing unit including developing cartridges that store a plurality of toners, the toners being of differing colors; and
    a controller arranged to perform a printing operation in which a substitute toner is selected to perform a remaining portion of the printing operation using the substitute toner, the substitute toner being selected when at least one of the toners of the developing unit is insufficient to complete the printing operation and the substitute toner being selected to have a greatest amount relative to the other toners;
    wherein the developing unit further comprises a customer replacement unit monitor (CRUM) memory to measure and/or store information related to an amount of a toner consumed by each of the developing cartridges.

2. The image forming apparatus of claim 1, wherein the controller excludes one of the plurality of toners having a specific color when selecting the substitute toner.

3. The image forming apparatus of claim 2, wherein the specific color is yellow.

4. The image forming apparatus of claim 1, wherein the controller selects one toner as the substitute toner.

5. The image forming apparatus of claim 1, further comprising:
    a display unit that displays a toner exchange signal to indicate a time to exchange the developing cartridges.

6. The image forming apparatus of claim 1, wherein the controller receives information related to the amounts of the toners from the developing unit.

7. The image forming apparatus of claim 1, further comprising:
    a sensor unit to provide information to the controller regarding a location of a printing medium along a printing medium path.

8. The image forming apparatus of claim 1, further comprising:
    a driving unit to receive signals from the controller to drive the printing operation.

9. The image forming apparatus of claim 1, further comprising:
    a user interface unit to accept commands from a user and provide the commands to the controller.

10. A method of controlling an image forming apparatus including a developing unit having developing cartridges to store a plurality of toners, the toners having different colors, and a controller to control the developing unit so as to perform a printing operation, the method comprising:

beginning the printing operation in accordance with a user's command;

determining whether one of the plurality of toners of the developing unit used for the printing operation is insufficient to complete the printing operation;

selecting one of the plurality of toners of a color different than the insufficient toner as a substitute toner when at least one toner is insufficient, the selected one having a greatest amount remaining relative to the other toners; and performing a remaining portion of the printing operation using the substitute toner.

11. The method of claim 10, wherein the determining whether one of the plurality of toners is insufficient further comprises comparing the amounts of the toners with a predetermined minimum amount;

wherein an amount of one of the toners is insufficient when the amount of the toner is less than the minimum amount.

12. The method of claim 10, wherein one of the plurality of toners having a specific color is excluded when selecting the substitute toner.

13. The method of claim 12, wherein one of the plurality of toners having a greatest amount relative to the non-excluded toners is selected as the substitute toner.

14. The method of claim 12, wherein a toner exchange signal is displayed to indicate a time to exchange the developing cartridges when all remaining amounts of the plurality of toners are insufficient.

15. A method of controlling an image forming apparatus, the method comprising:

determining whether amounts of toners used for a printing operation are sufficient to complete the printing operation, the toners being of different colors;

selecting a toner of another color, the selected toner having a greatest amount relative to the other toners, as a substitute toner when at least one toner is determined insufficient; and performing a remaining portion of the printing operation using the substitute toner.

16. The method of claim 15, wherein the remaining portion of the printing operation is less than a complete printing operation such that the at least one toner is determined insufficient such after the printing operation is started.

17. The method of claim 15, wherein the remaining portion of the printing operation is a complete printing operation such that the at least one toner determined insufficient is determined such before the printing operation is started.

* * * * *